April 2, 1968 G. E. BRADT ET AL 3,376,396

BIDIRECTIONAL MAGNETIC RECORDER WITH MOVABLE HEAD ASSEMBLY

Filed June 26, 1964 5 Sheets-Sheet 1

INVENTORS.
Gordon E. Bradt
Joseph H. Lancor, Jr.
BY
Hill, Sherman, Meroni, Gross & Simpson
Attys.

INVENTORS
Gordon E. Bradt.
Joseph H. Lancor, Jr.
BY
Hill, Sherman, Meroni, Gross & Simpson
Attys INVENTORS
Gordon E. Bradt
Joseph H. Lancor, Jr.
BY
Hill, Sherman, Meroni, Gross & Simpson Attys INVENTORS
Gordon E. Bradt
Joseph H. Lancor, Jr.
BY Hill Sherman Meroni, Gross & Simpson Attys INVENTORS
Gordon E. Bradt
Joseph H. Lancor, Jr.
BY
Hill, Sherman, Meroni, Gross & Simpson
Attys.

3,376,396
BIDIRECTIONAL MAGNETIC RECORDER WITH MOVABLE HEAD ASSEMBLY

Gordon E. Bradt, Wilmette, Ill., and Joseph H. Lancor, Jr., Arcadia, Calif., assignors to Bell & Howell Company, Chicago, Ill., a corporation of Illinois Filed June 26, 1964, Ser. No. 378,224
10 Claims. (Cl. 179—100.2)

ABSTRACT OF THE DISCLOSURE

Disclosed in a novel shifting head assembly for a magnetic tape apparatus which bidirectionally moves a multi-track magnetic tape past the head assembly by a tape drive capstan. The assembly, including an erase head and a transducer head, is shiftable to position the heads relative to the capstan and the tape upon changing the direction of tape movement so that a segment of the tape is pulled first past the erase head and is then pulled past the transducer head regardless of the direction of tape movement.

The present invention relates to improvements in the art of magnetic recording, and more specifically, to the field of bidirectional recording on a multi-track magnetic recording tape.

Magnetic recording assemblies designed for home use typically employ a magnetic recording tape about ¼" in width and wound on a 7" supply reel. At a recording speed of 7½" per second, the recording time for standard thickness tapes in one direction will be about 30 minutes. Most home type magnetic recorders are arranged such that the transducing head (one having both a recording and a reproducing function) and the erase head are aligned with a single track of the tape, the track being less than ½ the width of the tape. Then, when the tape is run through the machine in one direction, the reels are reversed and another recording is made on a second track of the tape also less than ½ the width of the tape. The effective recording time on a length of tape is thereby doubled. This procedure is not without it disadvantages, however. It is rather annoying to the user to have to stop the machine at the end of the recording time on one track, reverse the reels, and rethread the tape through the machine.

Some attempts have been made in the past to avoid the necessity of repositioning the reels and rethreading the tape by electrical and mechanical devices. One system of this type involved the use of a reversible drive means for propelling the tape, in combination with a pivotally supported head carrying structure comprising a central mounted transducer head, flanked on both sides with erase heads. In one direction of movement of the tape, one of the erase heads and the transducer head are arranged to engage the tape, the erase head, of course, preceding the transducer head for recording purposes. Then, when the direction of movement of the tape was reversed, the head supporting structure was pivoted, and moved laterally of the tape so that another track of the tape was engaged by the transducer head and the other of the two erase heads. Electrical switching means were also provided to energize the erase heads selectively, depending upon the direction of movement of the tape. Systems of this type do not always provide the best quality of recording and reproduction, and in any event require a duplication of erase heads.

The present invention provides an improved magnetic sound system which requires only a single transducer head and a single erase head for a bidirectional, multi-track tape recording system. In one embodiment of the invention, the tape recorder mechanism is provided with a reversible capstan drive in combination with a head shifting mechanism which is operable either manually or automatically upon the completion of tape travel in one direction to reorient the heads with respect to a tape and thereby permit continued recording on a different track of the tape, in the reverse direction. Specifically, in the broader aspects of the invention, we provide a bidirectional, multi-track magnetic tape recording mechanism which includes a magnetic head having a pair of pole pieces with means for rotating the head structure through an arc of substantially 180° about an axis extending perpendicular to the plane of the tape when the tape is in operative engagement with the head. In the use of the invention with a magnetic recording and reproducing assembly, the heads are rotated through an arc of substantially 180° and thereby reverse the relative positions of the erase head and the transducing head with respect to the tape, resulting in the proper orientation of the heads with the tape upon reversal of direction of movement of the tape.

Movement of the heads, as accomplished in the present invention, away from the tape in the process of reorienting them to the tape makes it convenient to inspect the condition of the heads periodically for wear and for the accumulation of foreign substances on the heads.

One of the objects of the present invention is to provide an improved bidirectional, multi-track magnetic recording mechanism which requires the use of only a single pair of heads.

Another object of the invention is to provide a reversible type magnetic recorder in which the head structures can be properly aligned with respect to the tape in either direction of the movement of the tape.

Still another object of the invention is to provide a magnetic recording mechanism with means for lifting the transducer head and the erase head away from the tape into a position where they are accessible for inspection.

Other objects and features of the present invention will become apparent to those skilled in the art from the following detailed description of several preferred embodiments which appear in the drawings.

Figure 1:
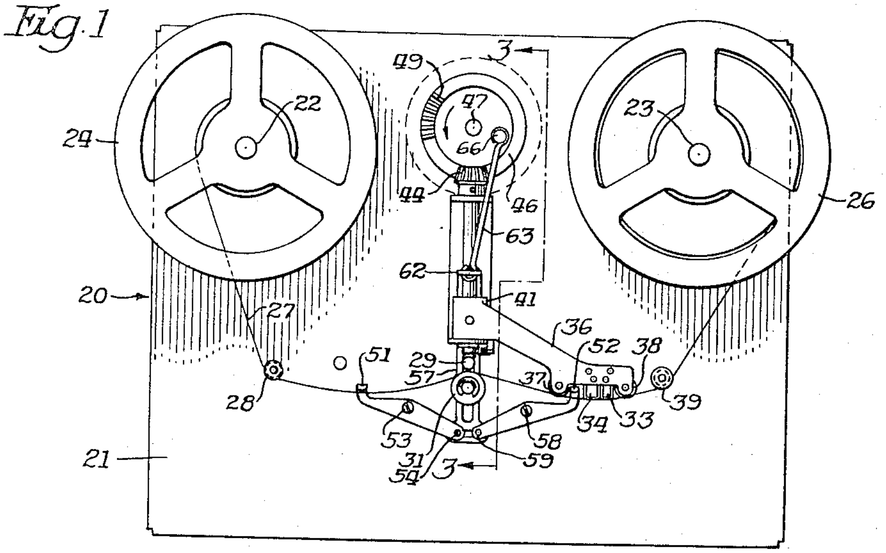
FIGURE 1 is a plan view of a magnetic recording assembly embodying one form of the present invention.

In FIGURE 1, reference numeral 20 indicates generally a tape recording mechanism of the type to which the present invention can be applied. The tape recording mechanism includes a tape deck 21 which supports all of the winding and reeling mechanism for tape transport. Rotatably mounted on the tape deck 21 are spindles 22 and 23 which carry reels 24 and 26. Reel 26 is referred to as the supply reel and reel 24 as the take-up reel, although those functions are reversed sequentially in the operation of the device of the present invention.

When a magnetic tape 27 is wound up on the reel 24, assuming movement of the tape from right to left as seen in FIGURE 1, it passes around a tape post 28 and is driven by its engagement with a driven capstan 29 and its associated pinch roller 31. The capstan 29 is designed to operate at a constant speed to provide a uniform velocity to the tape in its travel. To that end, the capstan 29 may be mounted on a relatively massive flywheel stabilizer 32 illustrated in FIGURE 3 of the drawings.

The tape 27 in moving from supply reel 26 to take-up reel 24 contacts a pair of heads 33 and 34 supported by an arm 36. A pair of tape guides 37 and 38, located on opposite sides of the heads, assure the proper contacting angle between the tape and the heads. The tape 27 is directed to the head assembly by a post 39.

Figure 2:
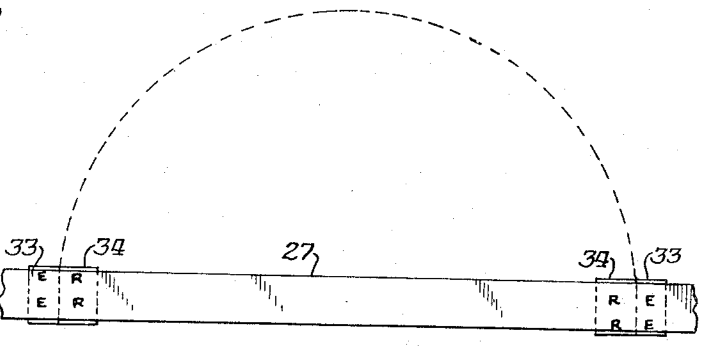
FIGURE 2 is a somewhat schematic view illustrating the manner in which the head shifting is accomplished to reorient the erase and transducer head with respect to the tracks of the tape.

A diagrammatic showing of the manner in which the heads are reoriented with respect to the tape 27 is provided in FIGURE 2. This particular embodiment of the invention involves the use of a stereo type head, but it will be recognized that the invention is equally applicable to monaural heads as well.

With the tape 27 moving from left to right, the tape first engages the erase head 33 consisting of two erase head portions both labeled E. These two erase head portions are arranged to contact the first and third tracks of the tape, counting the uppermost track of the tape as the first and the lowest track as the fourth. Similarly, the two transducer head portions labeled R are arranged to engage the tape along the same tracks as the erase head portions E to record intelligence on tracks one and three, respectively. Then, the erase and record heads are transposed by an angle of 180° and moved relative to the transverse dimension of the tape 27 into the position shown at the right-hand side of FIGURE 2. In this position, the heads are arranged to record upon tracks two and four of the tape 27 when the tape moves from right to the left as viewed in FIGURE 2. The tape is first contacted by the erase head 33 and then the transducer head 34 for recording on these two tracks.

Figure 3:
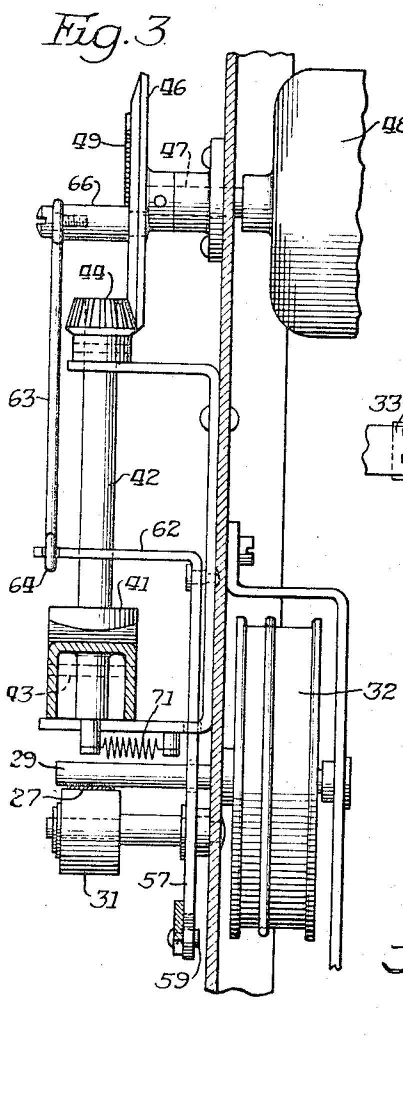
FIGURE 3 is a cross-sectional view taken substantially along line 3—3 of FIGURE 1.
Figure 4:
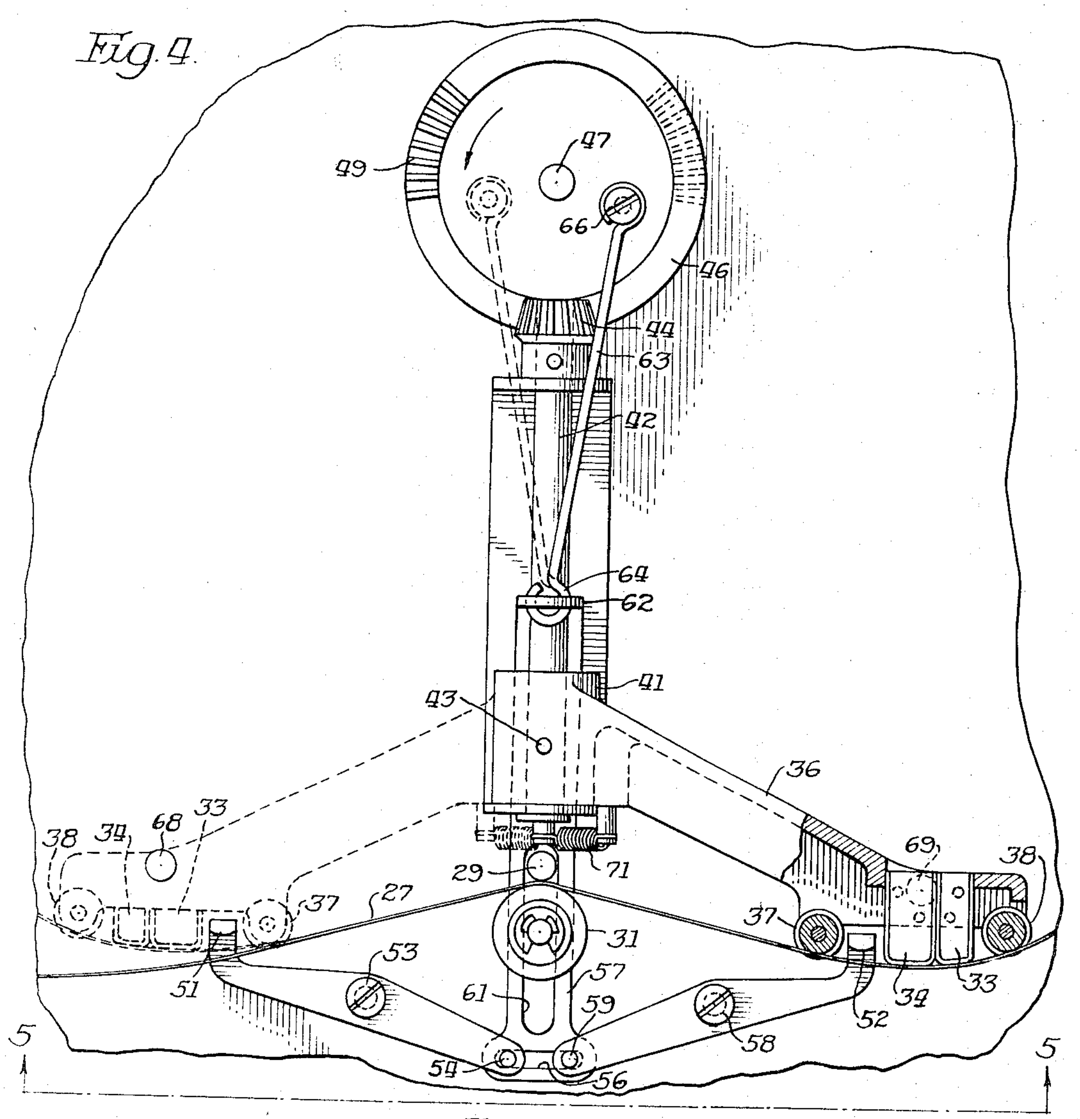
FIGURE 4 is a somewhat enlarged view of the head shifting mechanism embodied within the showing of FIGURE 1.
Figure 5:
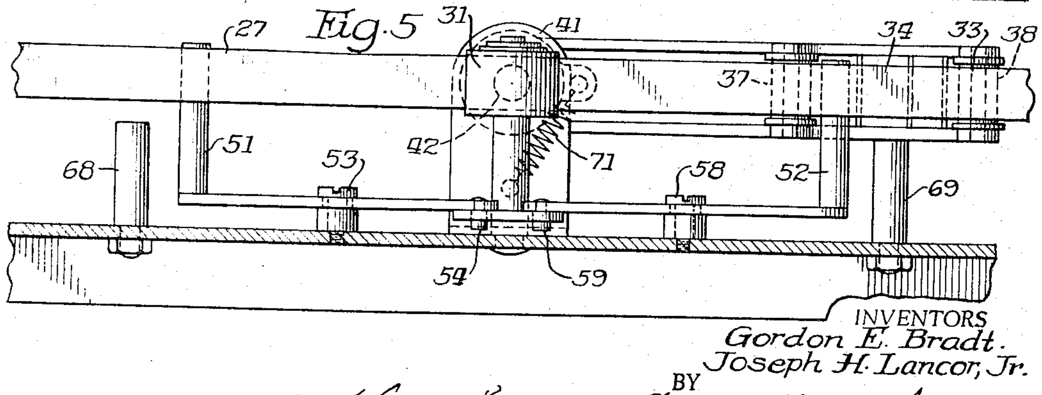
FIGURE 5 is a view taken substantially along line 5—5 of FIGURE 4.

The shifting of the head structures and their relocation in proper orientation with the new tracks of the tape is accomplished through a mechanism which is best shown in FIGURES 3 to 5 of the drawings. As best seen in FIGURE 4, the arm 36 has a collar 41 formed at one end, and the collar 41 is keyed to a rotatable shaft 42 by means of a pin 43. To one end of the shaft 42, there is secured a bevel pinion 44 which is arranged to overlie the periphery of a disk 46 mounted on a shaft 47. Shaft 47 is driven from a motor 48 located behind the tape deck 21, as shown in FIGURE 3. Along the portion of the periphery of the disk 46 there is provided a bevel gear section 49 which meshes with the bevel pinion 44 during a portion of the rotation of the disk 46.

In order to retract the tape to permit swinging movement of the arm 36 about the shaft 42 during reorientation of the heads 33 and 34 into the position shown in dotted outline in FIGURE 4, there is provided a pair of upstanding tape engaging arms 51 and 52 disposed between the tape 27 and the arm 36. The arm 51 is pivoted by means of a pin 53 to the tape deck 21, and its opposite end carries a pin 54 which permits that end to slide within a slot 56 provided in a link 57. Similarly, the tape engaging arm 52 is located on a lever which is pivoted by means of a pivot pin 58 to the tape deck 21, and has a pin 59 which rides in the slot 56. The link 57 also has a slot 61 which permits relative sliding movement to occur between the shaft carrying the pinch roller 31 and the link 57. As best seen in FIGURE 3, the link 57 has an outwardly extending portion 62 which is suitably slotted to permit the shaft 42 to extend therethrough. The outer end of the outwardly extending portion 62 which is suitably slotted to permit the shaft 42 to extend therethrough. The outer end of the outwardly extending portion 62 is connected to a rod 63 at a swivel connection identified at reference numeral 64. The opposite end of the rod 63 is trained around a post 66 which is secured to the disk 46 in a position eccentric to the axis of the shaft 47.

In operation, as the tape 27 approaches the end of its travel in one direction, say from right to left as viewed in FIGURE 1, the tape motion is arrested either manually or automatically, and the magnetic heads 33 and 34 are reoriented to provide proper alignment with the tape 27 in the opposite direction of tape travel. This may be accomplished automatically by providing a conductive strip composed of aluminum paint or the like on the tape 27 near its end, the conductive strip serving to bridge a pair of switch contacts (not shown) which may then energize a relay or the like to reverse the direction of rotation of the capstan 29 and to energize the motor 48 driving the disk 46. When the motor 48 is energized, it rotates the disk 46 in a counter-clockwise direction as viewed in FIGURES 1 and 4. Immediately upon rotation, the rod 63 pulls up on the link 57 so that the levers carrying the tape engaging arms 51 and 52 respectively are pivoted about the pivot pins 53 and 58 respectively. The link 57 is free to move upwardly as viewed in FIGURE 4 by the provision of the slot 61 through which the pinch roller 31 is mounted. As this happens, the pins 54 and 59 attached to the opposite ends of the lever arms move inwardly toward each other and up, and the tape engaging arms 51 and 52 pull down on the tape 27 so that it does not interfere with the arcuate movement of the head assembly.

When the disk 46 is rotated sufficiently to cause the bevel gear portion 49 to engage the bevel pinion 44, the resulting rotation of the shaft 42 causes the arm 36 to be rotated about the axis of the shaft by virtue of the driving connection provided by the pin 43. The heads 33 and 34 are thereby moved arcuately in a plane which is substantially normal to the plane of the tape deck 21. The heads 33 and 34 are positioned in proper alignment to the tracks of the tape 27 by means of a positioning pin 68 which positions the erase and transducer heads along the proper tracks of the tape for recording in the other direction. Similarly, a positioning pin 69 is provided on the opposite side of the assembly to position the heads in the condition shown in FIGURE 4 so that the erase and transducer heads are operatively aligned with a different track or tracks on the tape from the ones which they engage while resting on the positioning pin 68. A spring 71 having one end connected to the arm 36 seats the head structures on the positioning pins 68 and 69, respectively.

Figure 7:
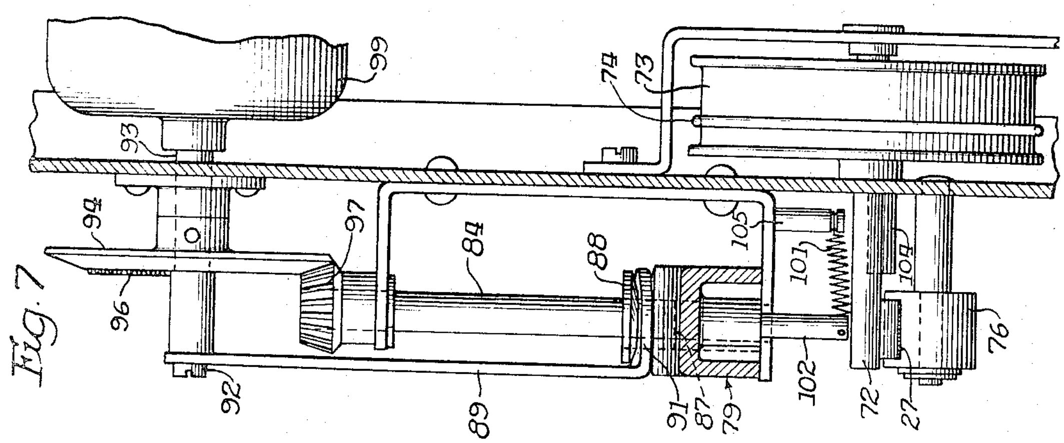
FIGURE 7 is a cross-sectional view taken substantially along line 7—7 of FIGURE 6.
Figure 6:
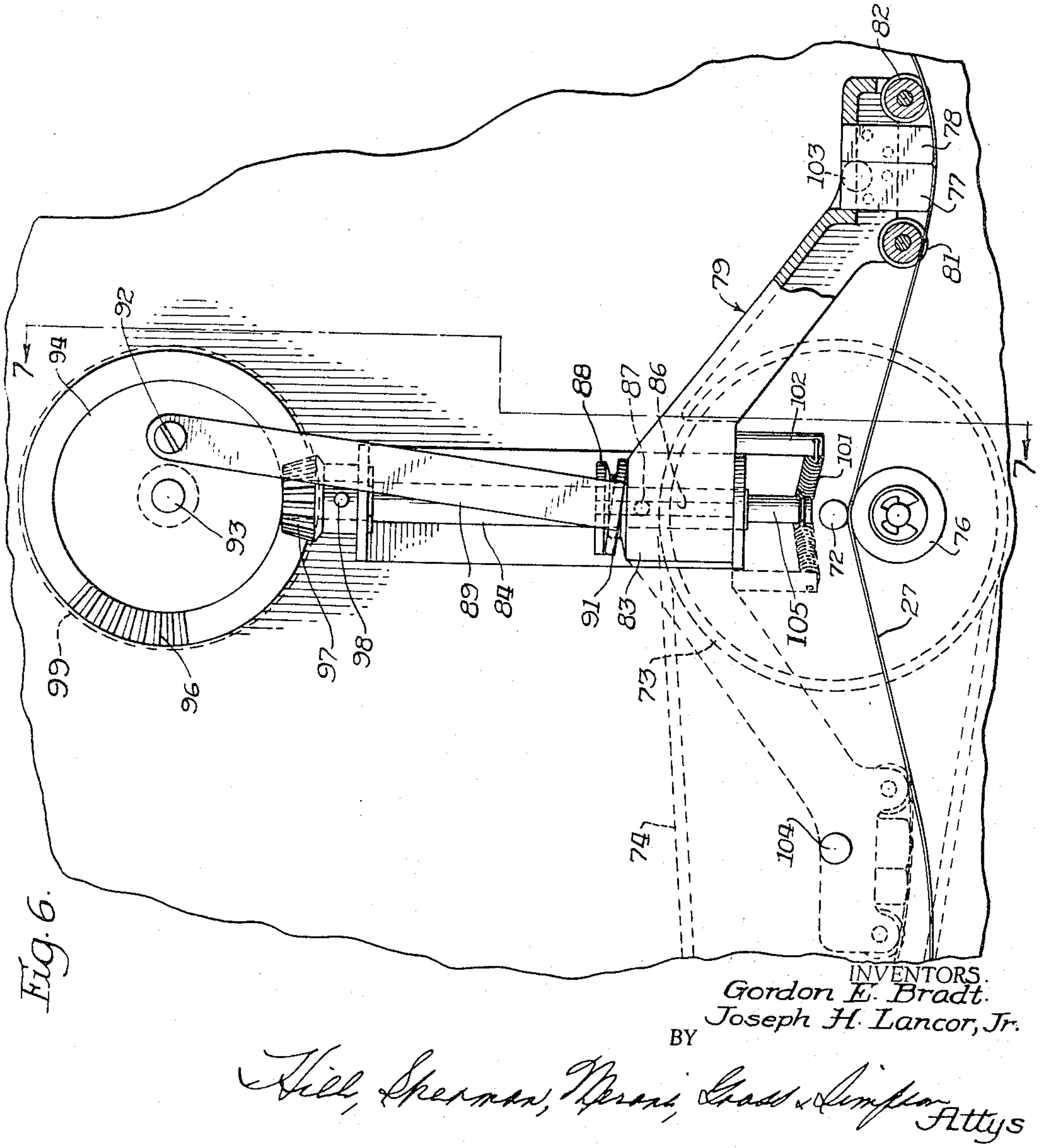
FIGURE 6 is a view similar to FIGURE 4 but embodying a modified form of the present invention.

The form of the invention illustrated in FIGURES 6 and 7 makes it unnecessary to use tape engaging arms to retract the tape when the magnetic heads are to be reoriented. This form of the invention employs a capstan 72 driven through a relatively massive flywheel 73 by means of a belt 74. A pinch roller 76 is provided adjacent the capstan 72, in the usual manner. A transducer head 77 and an erase head 78 are secured to an arm 79, the latter also carrying a pair of tape guides 81 and 82 at opposite sides of the magnetic heads. The arm 79 is formed with a collar portion 83 which embraces a shaft 84. A driving connection is provided between the shaft 84 and the collar 83, while permitting relative sliding movement therebetween by providing a groove 86 within the collar portion 83, and a pin 87 on the shaft 84 which slides in the groove 86. The shaft 84 also carries a collar 88 spaced from the collar portion 83. An actuating arm 89 has a bifurcated portion 91 extending between the collar 88 and the collar portion 83 of the arm 79. The opposite end of the arm 89 is secured by means of a pin 92 eccentrically with respect to a shaft 93 to which is keyed a disk 94. The periphery of the disk 94 is formed with a bevel gear 96 which is arranged to mesh with a bevel pinion 97 fixedly secured to the shaft 84 by means of a pin 98. The shaft 93 is driven by means of a motor 99 illustrated in FIGURE 7. One end of a spring is secured to a post 105, and the other end of the spring is connected to an extension 102 on the arm 79. In the position of the elements shown in FIGURE 6, the heads 77 and 78 are oriented with respect to particular tracks on the tape 27 by the provision of a positioning pin 103, and a similar positioning pin 104 on the opposite side of the capstan 72 locates the magnetic heads relative to the proper track when the tape is being driven in the opposite direction.

In operation, when the tape 27 has advanced sufficiently so that it is practically unwound from one of the reels, the motor 99 is energized, either manually or automatically by the type of switching mechanism previously described to rotate the disk 94. The arm 89, through its bifurcated portion 91 then pulls up against the collar 88 causing the arm 79 to slide relative to the shaft 84 by virtue of the pin and slot connection provided by the pin 87 and the groove 86. At the same time, the rotation of the bevel pinion 97 causes the shaft 84 to rotate, simultaneously rotating the arm 79 about the axis of the shaft 84. After the arm 89 has been raised to its position of maximum displacement, the arm 79 is moved inwardly toward the tape, and the heads 77 and 78 are positioned on the positioning pin 104 in proper engagement with the appropriate tracks of the tape 27 when the tape 27 is driven in the reverse direction.

Figures 8, 9, 10:
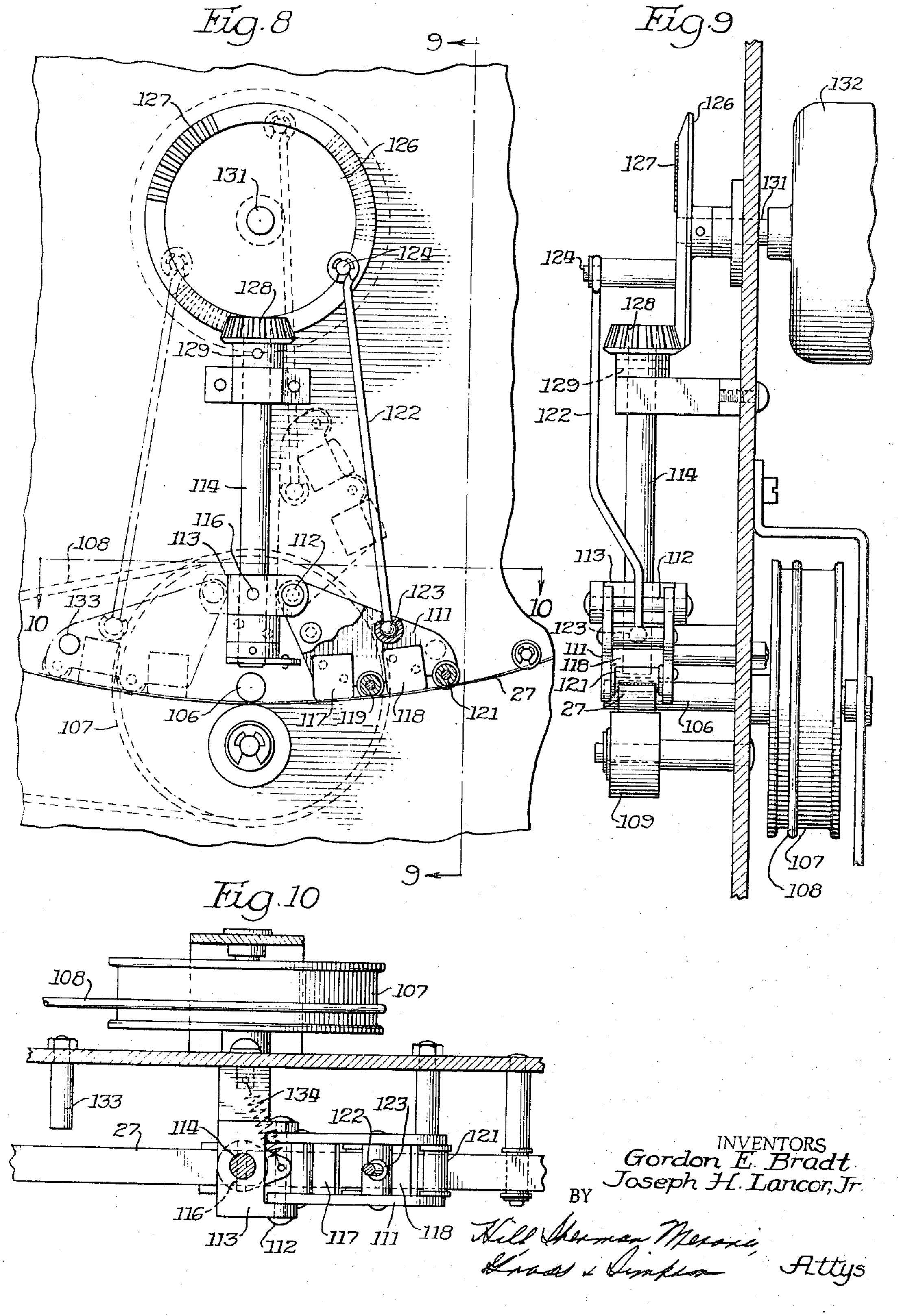
FIGURE 8 is a view of a still further modified form of the invention in which the magnetic head structure is tucked in during its rotation.
FIGURE 9 is a view taken substantially along line 9—9 of FIGURE 8.
FIGURE 10 is a view taken substantially along line 10—10 of FIGURE 8.

For installations where there is a limited amount of space in which the heads can be moved, the embodiment of FIGURES 8 through 10 may be employed. This form of the invention makes use of a capstan 106 extending from a massive flywheel 107 driven from a belt 108. A resiliently covered pinch roller 109 is provided adjacent the capstan 106 in the usual manner.

The head supporting structure in this instance takes the form of a plate 111 which is pivotally mounted by means of a pin 112 to a collar 113 which, in turn, is connected rigidly to a shaft 114 by means of a pin 116. The plate 111 carries an erase head 118 and an electromagnetic transducer head 117 in spaced relation, with a guide roller 119 being positioned between the two heads, and a guide roller 121 being positioned beyond the transducer head 118. An actuating rod 122 has one end received in a ball and socket joint 123 provided in the plate 111. The opposite end of the actuating rod 122 is trained about a pin 124 carried by a disk 126. A portion of the periphery of the disk 126 is provided with a bevel gear 127 which is arranged to mesh with a bevel pinion 128 fixed to the shaft 114 by means of a pin 129. The disk 126 is mounted on a shaft 131 driven by a motor 132.

When the tape comes near to one end of its travel, and the motor 132 is energized, rotation of the disk 126 causes the rod 122 to pivot the support plate 111 about the pivot pin 112, thereby tucking in the head supporting structure toward the shaft 114, as illustrated in dotted outline in FIGURE 8. Then, when the bevel gear 127 engages the bevel pinion 128, the shaft 114 rotates, causing the entire head supporting plate 111 to rotate about the axis of the shaft 114. Finally, when the head supporting plate 111 has been rotated through an arc of substantially 180°, the bevel gear 127 is no longer meshing with the bevel pinion 128, and the rod 122, upon continued rotation of the disk 126 positions the head supporting plate 111 onto a positioning pin 133 as shown in dotted outline in FIGURE 8. The spring 134 urges the head supporting structure into seated relation with the positioning pin 133.

Figure 11:
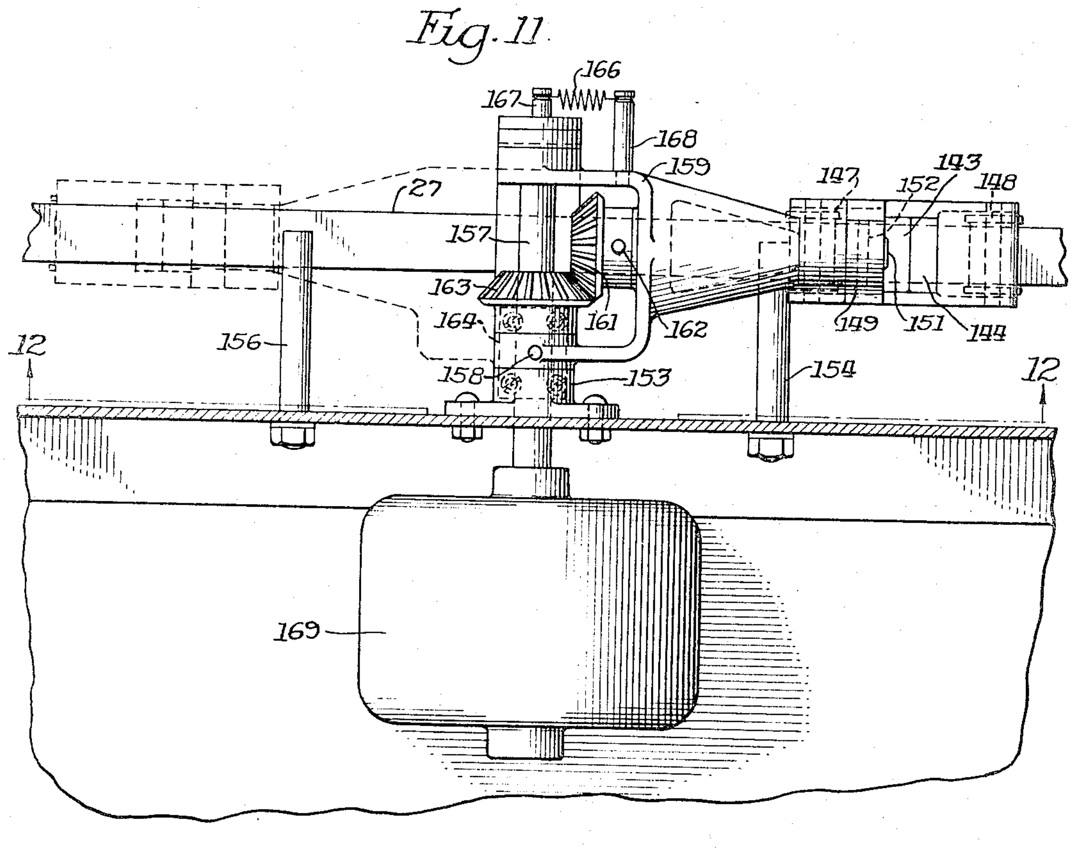
FIGURE 11 is a fragmentary view of still another modified form of the present invention.
Figure 12:
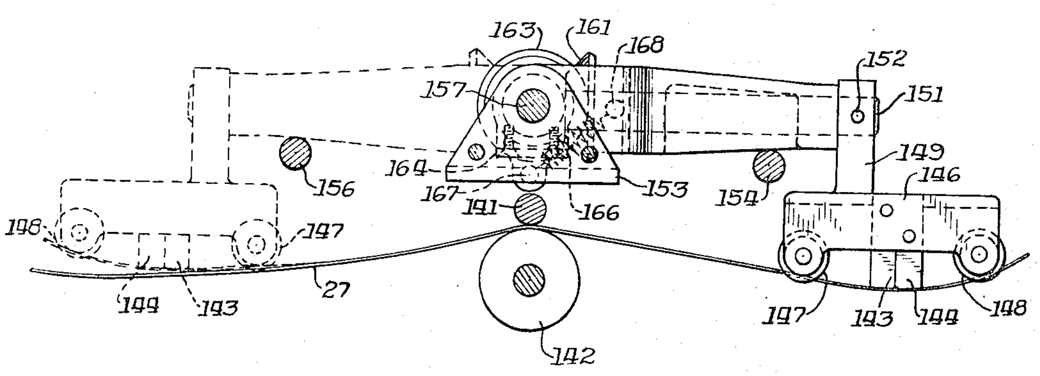
FIGURE 12 is a view taken substantially along line 12—12 of FIGURE 11.

The embodiment of the invention illustrated in FIGURES 11 and 12 of the drawings provides for arcuate movement of the heads in a substantially horizontal plane parallel to the tape deck. The assembly illustrated in these drawings includes a capstan 141 and an associated pinch roller 142. A magnetic head structure composed of an erase head 144 and a transducer head 143 is carried on a support arm 146 which also carries a pair of rollers 147 and 148 on opposite sides of the electromagnetic heads. The arm 146 has an extension 149 which is coupled to a shaft 151 by means of a pin 152. The shaft 151 is located within a generally U-shaped bracket 159, the latter being arranged to abut one of a pair of stop pins 154 and 156 to thereby position the electromagnetic heads 143 and 144 properly against the tape 27. A shaft 157 extends through a base 153. A pin 158 interconnects the bracket 159 to the shaft 157. The shaft 151 has a bevel gear 161 connected thereto by means of a pin 162. The gear 161 meshes with a similar stationary bevel gear 163 which is tied to the base 153 by means of a plate 164. A spring 166 has one end secured to a pin 167 and its opposite end to a pin 168 extending from the bracket 159, to urge the head supporting bracket against either stop pin 154 or stop pin 156, depending upon the direction of tape travel.

The operation of the system of FIGURES 11 and 12 should be evident from the foregoing description. When the head switching mechanism is actuated, a motor 169 drives the shaft 157, so that the meshing bevel gears 161 and 163 cause the magnetic head supporting structure to be rotated about the axis of the shaft 157. Simultaneously, the head structure is also rotated about the axis of the shaft 151 in moving from the position shown in the solid lines of FIGURE 12 to that shown in the dotted lines of that figure. When the supporting structure strikes the stop pin 156, the head structure is in position to engage the tape when moving in the opposite direction.

From the foregoing, it will be understood that the head shifting mechanisms of the present invention operate to reorient the magnetic heads with the tape as required by a change in the direction of the tape. While the invention has been described in conjunction with a typical magnetic recording mechanism which employs both an erase head and a transducer head, it should be evident that the system is also applicable to machines having only a recording function or only a reproducing function.

For example, one may employ stationary erase heads and provide one or more movable record or reproduce heads with a head repositioning means of the type described herein. In fact, then, the invention is applicable to any magnetic recording and/or reproducing system wherein the tape passes an array of heads in sequence, and it is necessary to preserve this sequential relationship in the heads upon reversal of tape travel. It should also be evident that the systems of the present invention are applicable to a large number of drive mechanisms. While the particular embodiments illustrated in the drawings contemplate a single reversible capstan drive, it should be evident that the head switching mechanisms are equally applicable to drives having separate capstans for driving in each direction. It should also be evident that various other modifications can be made to the described embodiments without departing from the scope of the present invention.

We claim:

1. In a bidirectional multi-track magnetic tape mechanism having a supply means and a take-up means, a single capstan tape drive means positioned intermediate said supply means and said take-up means for reversibly moving a tape between said supply means and said take-up means, and a magnetic head structure including an erase head and a transducer head, in sequence comprising:

means supporting said head structure to one side of said tape drive means for operative engagement with at least one track of the tape when said drive means pulls the tape in one direction across said head structure; and means for moving said support means to orient said head structure substantially 180° displaced from said first position and to the other side of said drive means so that the erase head and the transducer head of said head structure are oriented for engagement with at least one other track of the tape when said drive means pulls the tape in the other direction across said head structure.

2. A mechanism as in claim 1 in which the supply means and the take-up means define a tape deck and the movement of said support means is in a plane substantially perpendicular to said tape deck.

3. A mechanism as in claim 1 in which the supply means and the take-up means define a tape deck and the movement of said support means is in a plane substantially parallel to said tape deck.

4. A mechanism as in claim 1 in which the supply means and take-up means are reels.

5. A mechanism as in claim 1 in which said tape drive means includes a single reversibly rotatable, powered capstan to move said tape between said supply means and said take-up means, and a pinch roller to hold said tape against said capstan.

6. A mechanism as in claim 1 including means for retracting said tape from engagement with said tape drive means during orientation of said support means as said head is shifted from one side of said tape drive means to the other side thereof.

7. A mechanism as in claim 1 in which stop means are provided to support the head structure in alignment with the tape for both positions of the head structure wherein the heads of said head structure are repeatedly alignable with the desired tracks of the tape.

8. A mechanism as in claim 1 in which means for moving said support means includes a shaft adjacent said tape drive means for operably driving said support means.

9. A mechanism as in claim 1 in which the support means is an arm extending substantially parallel with said tape path and substantially radially from an axis extending perpendicular to the plane of the tape through said tape drive means.

10. A mechanism as in claim 9 in which said means for moving said support means includes a shaft operably connected with said support means, and powered means rotatably driving said shaft to orient said head structure wherein said erase head and said transducer head are oriented correctly for the particular direction of tape movement, wherein said erase head is ahead of said transducer head in the direction in which said tape moves between said supply means and said take-up means.

References Cited

FOREIGN PATENTS 23,324 11/1960 Japan.

TERRELL W. FEARS, *Primary Examiner.*

BERNARD KONICK, *Examiner.*

L. G. KURLAND, *Assistant Examiner.*